(12) United States Patent
Panhoelzl

(10) Patent No.: US 11,486,436 B2
(45) Date of Patent: Nov. 1, 2022

(54) WRENCH WIDTH ADAPTER FOR SCREWING A SENSOR INTO A THREADED OPENING

(71) Applicant: Robert Bosch GmbH, Stuttgart (DE)

(72) Inventor: Bernhard Panhoelzl, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 1004 days.

(21) Appl. No.: 16/304,588

(22) PCT Filed: Apr. 5, 2017

(86) PCT No.: PCT/EP2017/058113
§ 371 (c)(1),
(2) Date: Jan. 16, 2019

(87) PCT Pub. No.: WO2017/207140
PCT Pub. Date: Dec. 7, 2017

(65) Prior Publication Data
US 2019/0293106 A1    Sep. 26, 2019

(30) Foreign Application Priority Data

May 31, 2016    (DE) .................. 10 2016 209 479.3

(51) Int. Cl.
*G01L 19/00* (2006.01)
*F16B 37/14* (2006.01)
(Continued)

(52) U.S. Cl.
CPC .............. *F16B 37/14* (2013.01); *B25B 13/48* (2013.01); *B25B 13/56* (2013.01); *G01L 19/0007* (2013.01); *G01L 19/14* (2013.01)

(58) Field of Classification Search
None
See application file for complete search history.

(56) References Cited

U.S. PATENT DOCUMENTS

| 3,027,790 A | 4/1962 | Wagner |
| 4,630,480 A | 12/1986 | Betterton et al. |
| 2011/0290084 A1 | 12/2011 | Wang |

FOREIGN PATENT DOCUMENTS

| CN | 204387062 | * | 6/2015 | ............. F16B 37/14 |
| DE | 102014212523 B3 | * | 9/2015 | ............. B25B 13/04 |

(Continued)

OTHER PUBLICATIONS

International Search Report dated Jul. 26, 2017 of the corresponding International Application PCT/EP2017/058113 filed Apr. 5, 2017.

*Primary Examiner* — Lisa M Caputo
*Assistant Examiner* — Nigel H Plumb
(74) *Attorney, Agent, or Firm* — Norton Rose Fulbright US LLP; Gerard Messina

(57) ABSTRACT

A wrench width adapter for a component that is screwable into a threaded opening is provided, including a base body having a continuous inner recess, extending along a longitudinal axis, for receiving the screw-in component. An inner wall of the base body that delimits the inner recess, in a cross-sectional plane perpendicular to the longitudinal axis, has, at least in part, the shape of a regular polygon corresponding to a first wrench width dimension, and an outer wall of the base body has, at least in part, the shape of a regular polygon corresponding to a second wrench width dimension that is greater than the first wrench width dimension.

11 Claims, 5 Drawing Sheets

(51) Int. Cl.
*B25B 13/48* (2006.01)
*B25B 13/56* (2006.01)
*G01L 19/14* (2006.01)

(56) References Cited

FOREIGN PATENT DOCUMENTS

| | | | | |
|---|---|---|---|---|
| JP | H0749274 A | 2/1995 | | |
| JP | H08223669 A | 8/1996 | | |
| JP | 2007049274 A | 2/2007 | | |
| WO | 2004/001362 | 12/2003 | | |
| WO | WO-2004001362 A1 * | 12/2003 | ........... | G01L 19/003 |
| WO | 2009/039583 | 4/2009 | | |
| WO | WO-2009039583 A1 * | 4/2009 | ............ | E04G 21/26 |
| WO | 2013118843 A1 | 8/2013 | | |
| WO | 2015/197276 | 12/2015 | | |

* cited by examiner

WRENCH WIDTH ADAPTER FOR SCREWING A SENSOR INTO A THREADED OPENING

FIELD OF THE INVENTION

The present invention relates to a wrench width adapter for a component that is screwable into a threaded opening.

BACKGROUND INFORMATION

A considerable number of components that are screwable into a threaded opening are believed to be available from the related art, which for this purpose include a threaded connector and a component base body that adjoins in the longitudinal axis of the component, and whose outer circumference in a cross-sectional plane perpendicular to the longitudinal axis has, at least in part, the shape of a regular polygon corresponding to a first wrench width dimension. Customary hexagon head screws are the simplest example of such components. A wrench width dimension, also in the context of the present patent application, is understood to mean the distance between two parallel surfaces of a regular polygon that is used for transmitting a torque with the aid of a form-fit tool. Associated tolerances for internal and external parts, for example tolerances between an open-end wrench and a screw head, are addressed in corresponding standards. For a conventional hexagon head screw or screw nut having a hexagon outer surface, the wrench width dimension is thus defined by the distance between two partial surfaces of the hexagon, facing away from each other, that are diametrically opposed with respect to the screw axis.

Pressure sensors in automotive technology represent one particular example of components that are screwable into a threaded opening. These types of pressure sensors have a threaded connector that is screwable into a pressure measurement port of the motor vehicle, for example a cylinder of the internal combustion engine or a high-pressure line of a fuel injection system. The threaded connector, viewed in a longitudinal axis of the pressure sensor, is adjoined by a sensor base body whose outer circumference in a cross-sectional plane perpendicular to the longitudinal axis has, at least in part, the shape of a regular polygon corresponding to a desired wrench width dimension. The outer circumference often forms a hexagon. In addition, the sensor base body, viewed in the longitudinal axis of the pressure sensor, is adjoined by an electrical plug part for connecting the pressure sensor to a control unit, for example. This type of pressure sensor is discussed in EP 1 518 099 B1, for example.

These pressure sensors are screwed into the threaded opening with the aid of a tightening tool, such as a socket, that is placed over the hexagon. The socket must be guidable over the plug part in order to be placed against the hexagon of the sensor base body in a form-fit manner. However, the wrench width dimension of this hexagon must not be reduced too greatly, since the tool required for the screwing-in then cannot be drawn over the plug part in every case. This limits the freedom in configuring and miniaturizing the pressure sensor as well as the installation site of the pressure sensor.

SUMMARY OF THE INVENTION

The present invention provides for use of a specialized wrench width adapter for screwing in a component that is screwable into a threaded opening, and that may remain on the component. The wrench width adapter according to the present invention includes a base body that is provided with a continuous inner recess, extending along a longitudinal axis, for receiving the screw-in component. An inner wall of the base body which delimits the inner recess, in a cross-sectional plane perpendicular to the longitudinal axis, has, at least in part, the shape of a regular polygon corresponding to a first wrench width dimension, while an outer wall of the base body, at least in part, has the shape of a regular polygon corresponding to a second wrench width dimension that is greater than the first wrench width dimension.

Advantages of the Invention

Due to the wrench width adapter according to the present invention, components that are screwable into threaded openings on the one hand may advantageously be configured with arbitrarily small wrench widths, and on the other hand may still be screwed in, optionally with the tightening tools used thus far. This may be achieved very easily by inserting the components into the wrench width adapter. The inner wall of the wrench width adapter has a first wrench width dimension that corresponds to the wrench width dimension of an outer circumference of the component base body, so that the wrench width adapter engages with the outer circumference of the component base body in a form-fit manner when the component is inserted. In addition, the wrench width adapter on its outer wall has a second wrench width dimension that may, for example, advantageously correspond to the tightening tools used thus far. The wrench width adapter advantageously provides a number of options for configuring the outer wall with a completely different geometry than the inner wall that is adapted to the component in question. Thus, for example, additional measures such as a locking arrangement or anti-dismantling protection which cannot be provided on the component may also optionally be integrated into the wrench width adapter.

Advantageous specific embodiments and refinements of the present invention are made possible by the features described in the dependent claims.

The wrench width adapter advantageously includes a base body on which at least one projection that protrudes into the inner recess is formed. The at least one projection protruding into the inner recess may represent a stop surface for the component when the component is inserted into the inner recess. This advantageously prevents the component from sliding through the inner recess. In addition, the wrench width adapter may advantageously be clamped between the component base body and a countersurface that encloses the threaded opening when the component is screwed into the threaded opening associated with the component, and therefore cannot be lost.

At least one fastening arrangement for fastening the base body to the component may advantageously be provided on the base body of the wrench width adapter. The at least one fastening arrangement, for example viewed in the direction of the longitudinal axis, may include a tab that protrudes from the base body in the direction of the inner recess on the side of the base body facing away from the at least one projection. The component may thus be advantageously clamped between the projection and the tab so that the wrench width adapter is locked on the component. The at least one fastening arrangement may advantageously be configured as a detent arrangement, a securing lug, or a secured wall section. A detent lug of the detent arrangement then automatically engages behind a projection or a support surface of the component when the component is inserted into the inner recess of the wrench width adapter. When the fastening arrangement is configured as a securing lug, the lug is bent over after the component is inserted, and with its protruding tab engages behind a support surface on the component. In addition, it is possible to configure at least one wall section of the base body in such a way that it may be secured in the direction of the inner recess.

In one exemplary embodiment, the base body of the wrench width adapter includes a circumferential wall that extends in the longitudinal axis, the inner side of which forms the inner wall and the outer side of which forms the outer wall. Additionally or alternatively, the base body includes a ring-shaped base plate that is perpendicular to the longitudinal axis and which may be configured in one piece with the wall, and that protrudes into the inner recess, thus forming the at least one projection. The base plate is advantageously used for securely supporting the wrench width adapter on a countersurface in which the threaded opening for the at least one component is provided. The base body of the wrench width adapter may be easily and cost-efficiently manufactured from plastic or metal.

Also advantageous is a combination of the wrench width adapter with a component that is screwable into a threaded opening, and that includes a threaded connector and a component base body that adjoins in the longitudinal axis of the component and whose outer circumference in a cross-sectional plane perpendicular to the longitudinal axis has, at least in part, the shape of a regular polygon corresponding to the first wrench width dimension. The component is advantageously inserted into the receptacle in such a way that the threaded connector is guided through the inner recess, and outwardly protrudes from the base body of the wrench (width) adapter in the direction of the longitudinal axis. The assembly made up of the wrench width adapter and the component may advantageously be delivered and installed as a unit.

Without being limited thereto, a sensor, in particular a pressure sensor, may be provided as a component that is screwable into a threaded opening. The use of sensor plug parts having a diameter, perpendicular to the longitudinal axis of the sensor, that is larger than the wrench width dimension of the sensor base body may be made possible by the wrench width adapter. A socket used for screwing in the sensor, and which in this case is no longer able to come to rest on the outer circumference of the sensor base body, may then advantageously come to rest on the outer wall of the wrench width adapter in a form-fit manner.

BRIEF DESCRIPTION OF THE DRAWINGS

FIG. 6b shows an enlarged detailed view of detail I from FIG. 6a.

DETAILED DESCRIPTION

Figure 1:
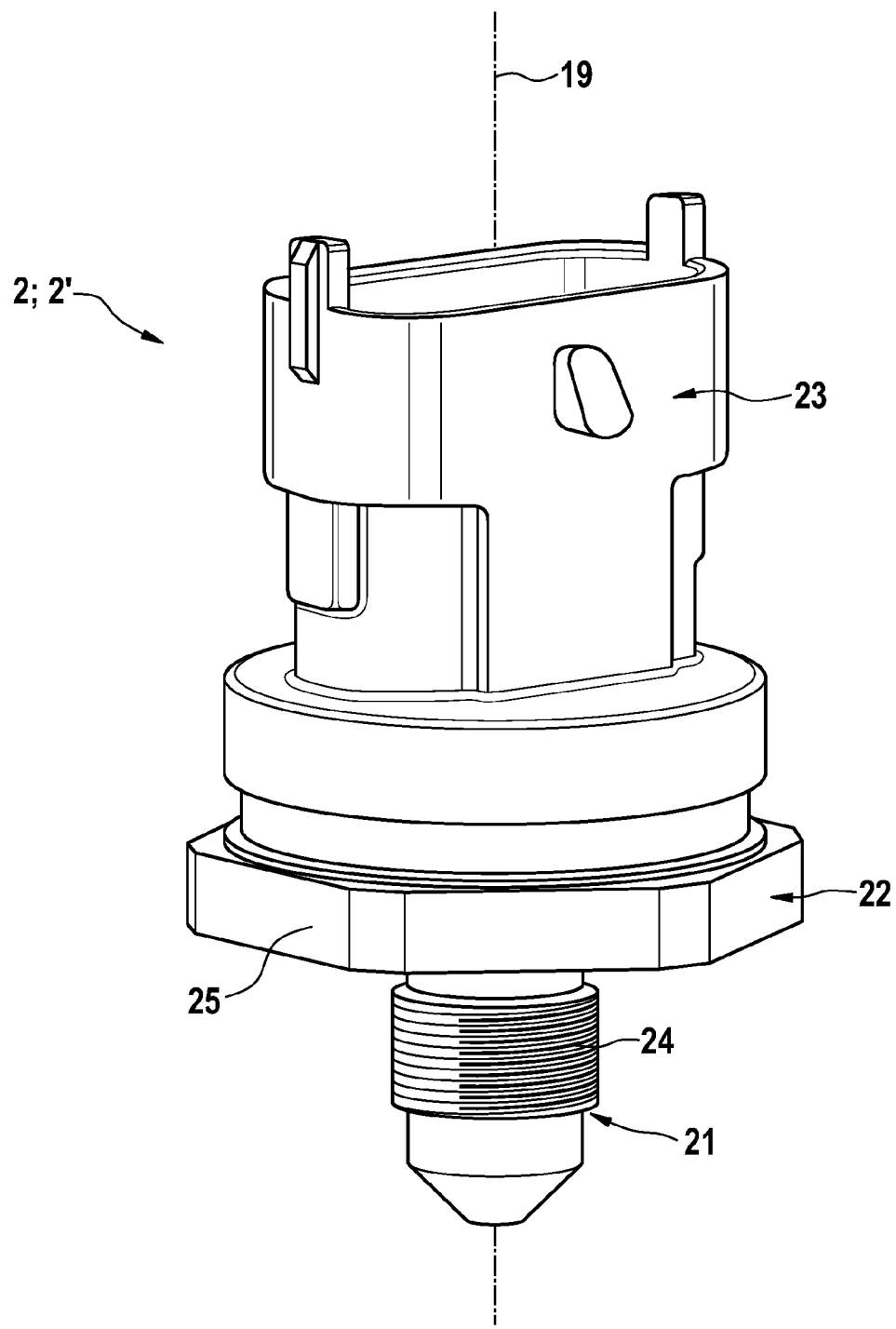
FIG. 1 shows a pressure sensor according to the related art.

FIG. 1 shows a pressure sensor 2' from the related art, for example from EP 1 518 099 B1. Known pressure sensor 2' includes a component base body 22 or sensor base body whose outer circumference in a cross-sectional plane perpendicular to a longitudinal axis 19 of pressure sensor 2' has the shape of a regular polygon. In the present example, the polygon forms a hexagon 25, for example. Hexagon 25 has a first wrench width dimension S1. On the bottom side of component base body 22 a threaded connector 21 protrudes from component base body 22. Threaded connector 21, which has a rotationally symmetrical configuration with respect to longitudinal axis 19, includes a screw thread 24 on an outer circumference. Threaded connector 21 is used to screw the pressure sensor into a pressure measurement port, not illustrated. A pressure channel, not discernible in FIG. 1, that passes centrally through threaded connector 21 connects the pressure measurement port to a sensor element in the interior of component base body 22. A plug part 23 situated on component base body 22 on the side thereof facing away from threaded connector 21 is used for electrically connecting pressure sensor 2'. For details of the configuration of the pressure sensor, reference is made, for example, to the pressure sensor provided in EP 1 518 099 B1.

However, pressure sensor 2' illustrated in FIG. 1 is only one example of a component 2 that is screwable into a threaded opening. In principle, however, the wrench width adapter according to the present invention to be described below is provided not only for the illustrated pressure sensors, but also for any other components that are screwable into a threaded opening, and that include a threaded connector and a component base body adjoining same in the longitudinal axis, and whose outer circumference in a cross-sectional plane perpendicular to the longitudinal axis has, at least in part, the shape of a regular polygon. For example, the screwable component may also be a hexagon head screw. The pressure sensor is used here only as one example of such a component.

Figure 2A:
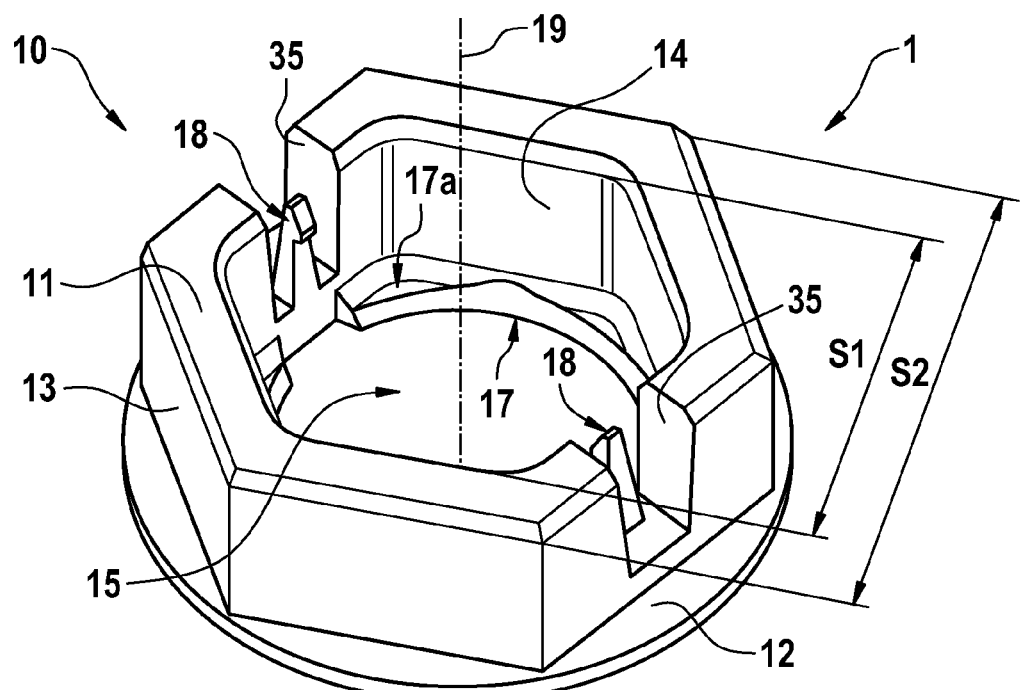
FIG. 2a shows a first exemplary embodiment of the wrench width adapter according to the present invention.

FIG. 2a illustrates one exemplary embodiment of wrench width adapter 1 according to the present invention. Wrench width adapter 1 includes a base body 10 having a rotationally symmetrical configuration with respect to a longitudinal axis 19, and may be manufactured in one piece from plastic or metal. In the context of the present patent application, a component that has a rotationally symmetrical configuration with respect to a predefined axis is understood to mean a component whose external shape, for a stationary observer, is transferable into the same shape by rotating the component about the predefined axis by a rotation angle of 180° or less. This means that for a rotation by 180°, for example, for a stationary observer there is no difference in the external shape of the component compared to the starting situation. Thus, for example, the external shape of a cuboidal component may be transferred back to its original shape by rotating by 180° about an axis of the cuboidal component that is perpendicular to the lateral surfaces. Of course, a cylinder may be rotated by any small angle about its main axis of symmetry without changing its external shape. All of these components therefore have a configuration that is rotationally symmetrical about the stated axes.

Base body 10 includes a circumferential wall 11 that extends in a longitudinal axis 19, the inner side of which forms an inner wall 14 and the outer side of which forms an outer wall 13. Inner wall 14 delimits a continuous inner recess 15 that extends along longitudinal axis 19 and that is used for receiving screw-in component 2.

As is apparent in FIG. 2a, inner wall 14 of base body 10 in a cross-sectional plane perpendicular to longitudinal axis 19 has, at least in part, the shape of a regular polygon corresponding to a first wrench width dimension S1. In the present exemplary embodiment the regular polygon is a hexagon, but may also be an octagon or a pentagon or a square or some other regular polygon. In addition, base body 10 includes an essentially ring-shaped base plate 12 that is perpendicular to longitudinal axis 19 and integrally formed in one piece on circumferential wall 11. This base plate 12 laterally protrudes from wall 11 at the lower edge of base body 10, thus forming a small flange. At the bottom side of base body 10, base plate 12 protrudes slightly into inner recess 15, thus forming at least one projection 17 with a stop surface 17a, situated obliquely or perpendicularly, for example, with respect to longitudinal axis 19, for component 2. Outer wall 13 of base body 10 in FIG. 2a has, at least in part, the shape of a regular polygon corresponding to a second wrench width dimension S2 that is larger than first wrench width dimension S1.

In addition, fastening arrangement 18 may be provided on wrench width adapter 1. As is apparent in FIG. 2a, circumferential wall 11 includes two recesses 35, for example, which, starting approximately from base plate 12, extend in parallel to longitudinal axis 19 to the top side of base body 10 and to wall 11. A flexible web that forms a detent arrangement 18a and whose end includes a tab 16 that protrudes from base body 10 in the direction of inner recess 15 is situated in each of these recesses 35. Two fastening arrangement 18 may be provided which are diametrically opposed, for example, with respect to longitudinal axis 19. However, there is also the option for providing only one fastening arrangement or more than two fastening arrangement.

Figure 2B:
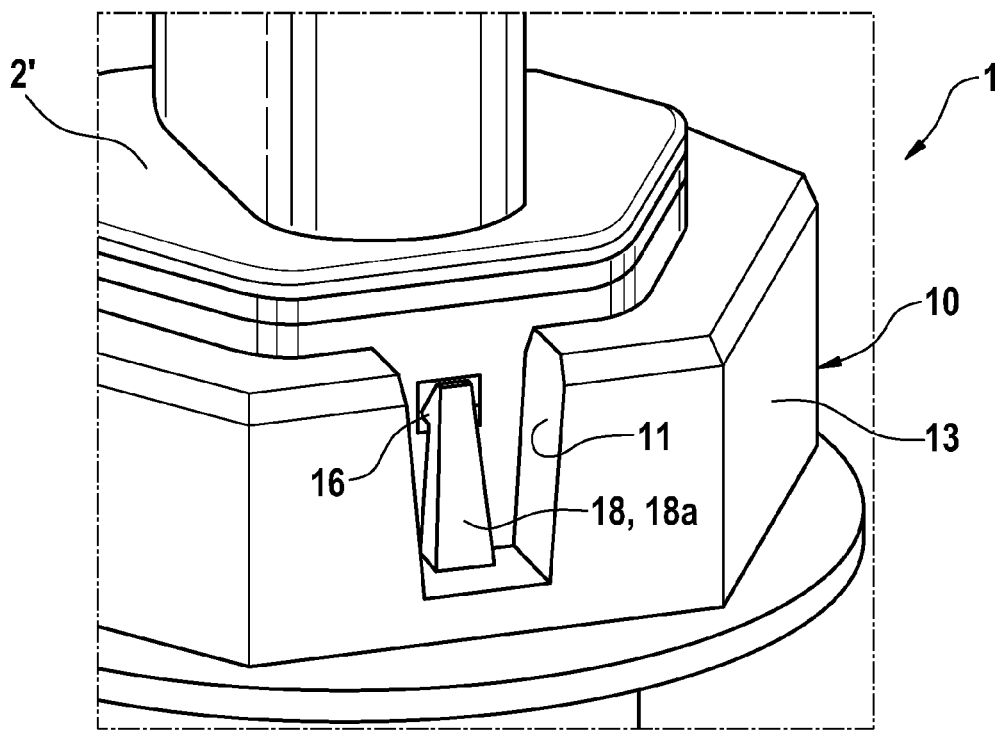
FIG. 2b shows the wrench width adapter from FIG. 2a in a state in which it is fixed to a pressure sensor.
Figure 4:
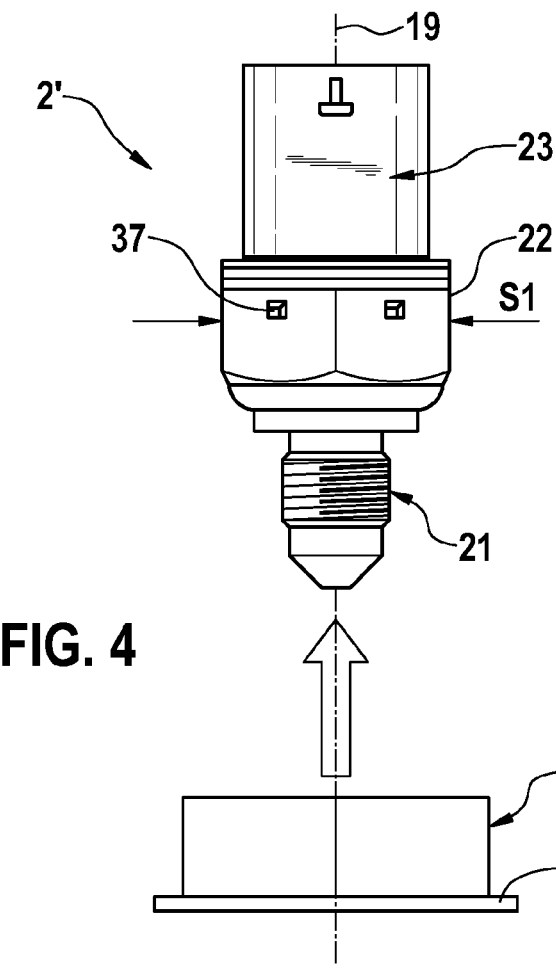
FIG. 4 shows the mounting of a wrench width adapter according to the present invention on a pressure sensor.

FIG. 4 illustrates the mounting of wrench width adapter 1 on a pressure sensor 2' that is used as component 2. Longitudinal axis 19 of wrench width adapter 1 coincides with longitudinal axis 19 of pressure sensor 2'. Wrench width adapter 1 is pushed over threaded connector 21 in the direction of longitudinal axis 19 until component base body 22 of pressure sensor 2' penetrates into inner recess 15 and comes to rest on stop surface 17a. As is most clearly apparent in FIG. 5a, in the end position, threaded connector 21 protrudes from wrench width adapter 1 on the bottom side thereof, and tabs 16 of detent arrangement 18b engage with corresponding grooves or recesses 37 in component base body 22, as illustrated in FIG. 2b, so that wrench width adapter 1 is fastened to pressure sensor 2'. Component base body 22 may be clamped between stop surface 17a, situated on the bottom side of wrench width adapter 1, and tabs 16 of detent arrangement 18a situated on the top side of wrench width adapter 1.

During mounting of wrench width adapter 1, component base body 22 is inserted into inner recess 15. The outer circumference of component base body 22 hereby engages with inner wall 14 in a form-fit manner. This is possible when the outer circumference of component base body 22 and inner wall 14 of wrench width adapter 1 correspond to the same wrench width dimension S1. This means that component base body 22 has an outer circumference which in a cross-sectional plane perpendicular to longitudinal axis 19 has the shape of a regular polygon corresponding to first wrench width dimension S1, and that inner wall 14 of base body 10 in the cross-sectional plane perpendicular to longitudinal axis 19 has the same shape of a regular polygon corresponding to first wrench width dimension S1. In the context of the present patent application, inner wall 14 of base body 10 in the cross-sectional plane perpendicular to longitudinal axis 19 has the shape of a regular polygon corresponding to a first wrench width dimension S1 of component base body 22, even when inner recess 15, for tolerance reasons, must be dimensioned slightly larger than the outer circumference of component base body 22 so that component 2 may still be easily inserted into inner recess 15. Circumferential wall 11 may optionally also have a certain elasticity to facilitate insertion of component 2 into inner recess 15.

Figure 3A:
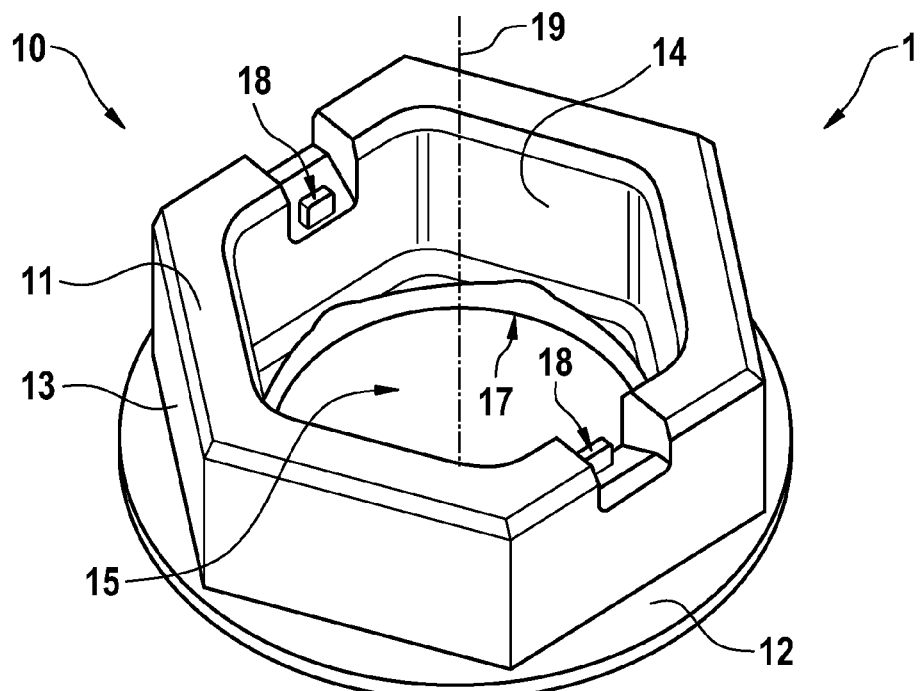
FIG. 3a shows a second exemplary embodiment of the wrench width adapter according to the present invention.
Figure 3B:
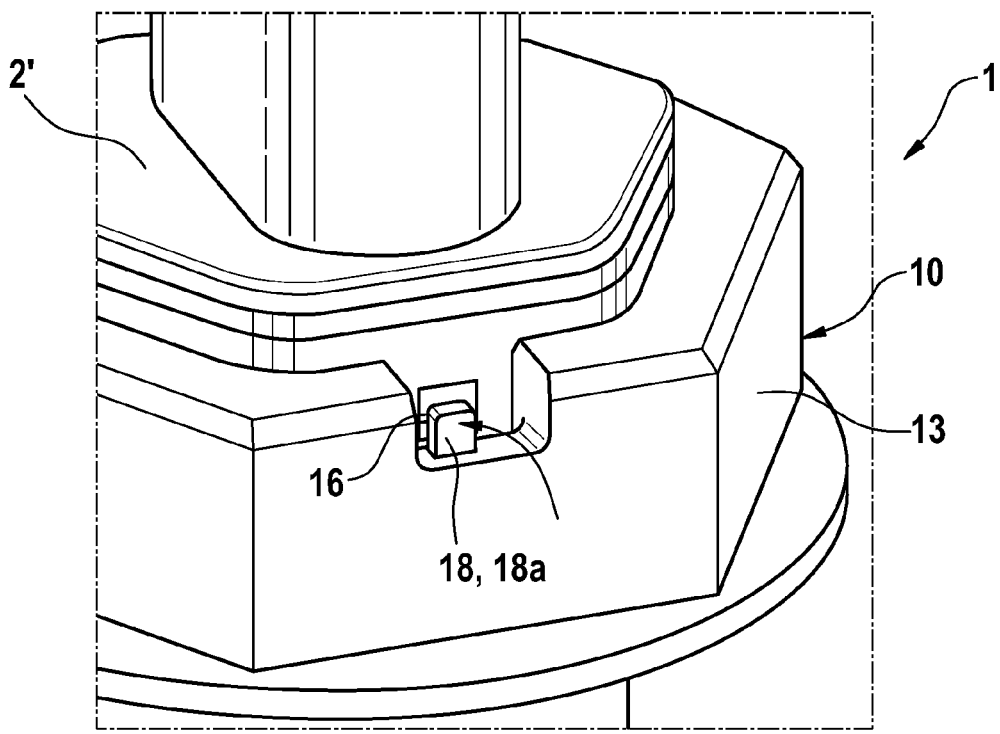
FIG. 3b shows the wrench width adapter from FIG. 3a in a state in which it is fixed to a pressure sensor.

FIGS. 3a and 3b show another exemplary embodiment of wrench width adapter 1 according to the present invention. In contrast to the exemplary embodiment in FIGS. 2a and 2b, in this case fastening arrangement 18 are configured as bending lugs 18b, which, after component 2 is inserted into inner recess 15 of wrench width adapter 1, are bent in the arrow direction in FIG. 3b, so that outer tabs 16 of the bending lugs protrude from base body 10 in the direction of inner recess 15, and may thus engage with recesses 37 in component base body 22.

Figure 6A:
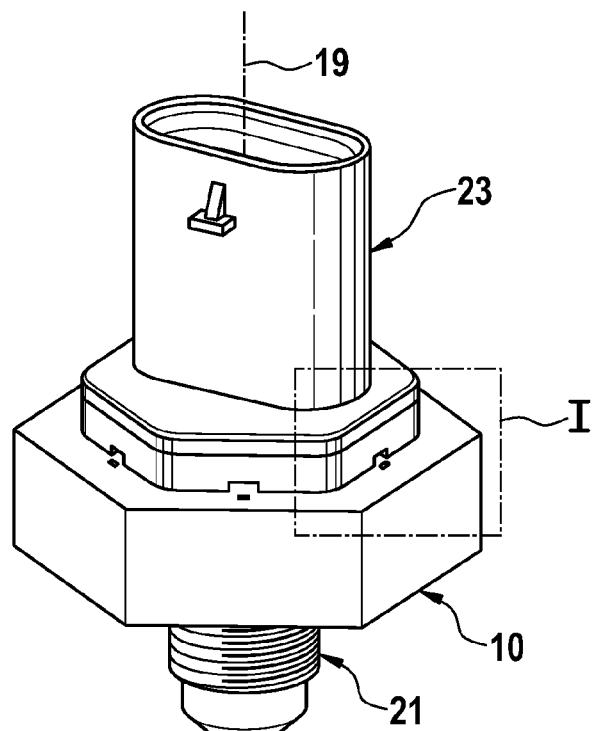
FIG. 6a shows a third exemplary embodiment of the wrench width adapter according to the present invention in a state in which it is fixed to a pressure sensor.
Figure 6B:
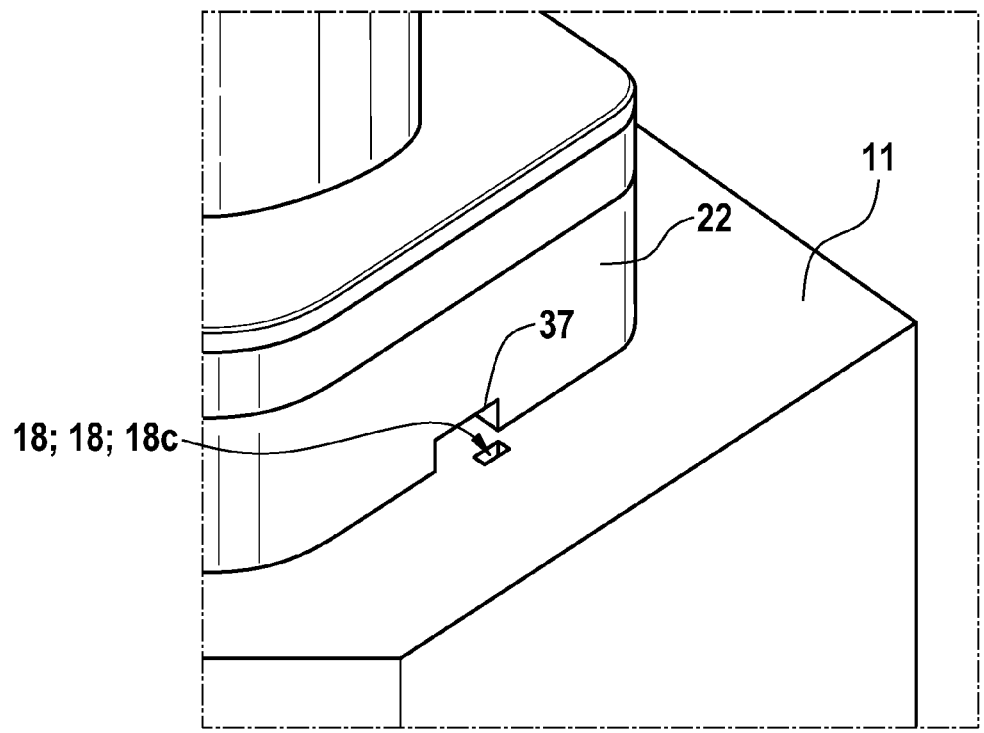

FIGS. 6a and 6b show a third exemplary embodiment of wrench width adapter 1 according to the present invention. As is apparent in FIG. 6a, in this exemplary embodiment wrench width adapter 1 includes a base body 10 without a base plate. The base body is thus made up of a circumferential wall 11 that extends in longitudinal axis 19, and whose inner side forms inner wall 14 and whose outer side forms outer wall 13. In this exemplary embodiment as well, base body 10 may include at least one projection, not discernible in FIG. 6a, that protrudes into inner recess 15 and that forms a stop surface 17a for component 2. In FIGS. 6a and 6b, fastening arrangement 18 are configured as securable wall sections 18c. As is most clearly apparent in FIG. 6b, circumferential wall 11 on its top side may have a small, blind hole-like recess. A wall section 18c that delimits this blind hole-like recess and that faces inner wall 14 has a fairly thin-walled configuration, and with the aid of a tool inserted into the blind hole-like recess may be secured in the direction of inner recess 15. A tab 16 that protrudes in the direction of the inner recess and engages, for example, with a recess 37 in component base body 22 is thus formed.

Figure 5A:
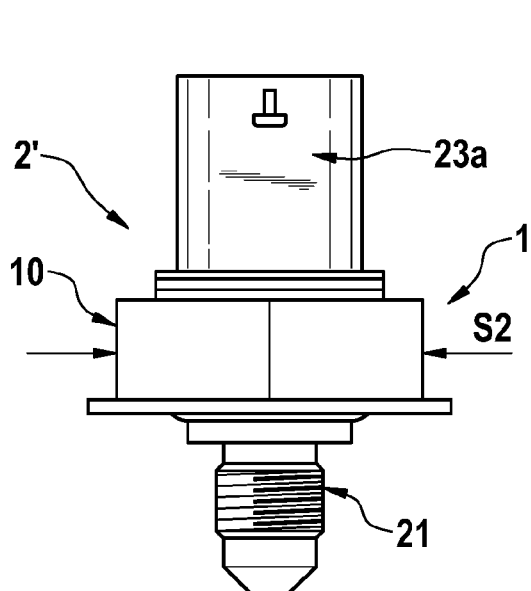
FIGS. 5a and 5b show wrench width adapters that are situated on pressure sensors with different plug parts.
Figure 5B:
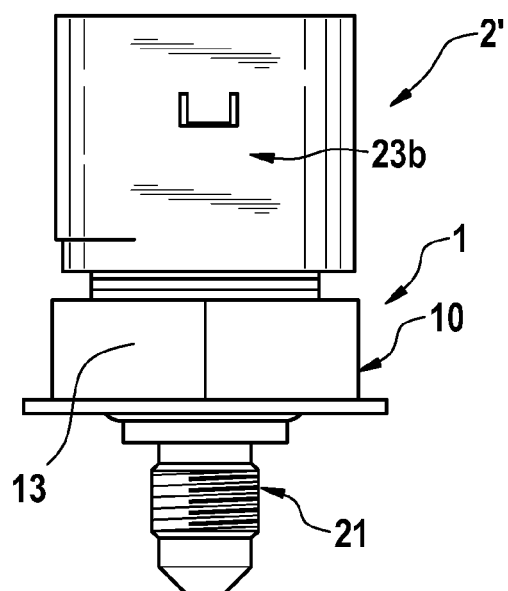

FIGS. 5a and 5b each illustrate a combination of a wrench width adapter 1 and a pressure sensor 2' that is screwable into a threaded opening. Pressure sensors 2' differ by the outer dimensions of their respective plug parts. Thus, plug part 23a in FIG. 5a is dimensioned smaller than plug part 23b of pressure sensor from FIG. 5b. In both cases, however, the pressure sensors may be screwed into the associated pressure measurement ports using the same tool. As is clearly apparent in FIG. 5b, although a socket, corresponding to second wrench width dimension S2, that is pushed over plug part 23b is no longer able to come to rest on the outer circumference of the sensor base body, the socket is able to engage in outer wall 13 of wrench width adapter 1 in a form-fit manner, since the outer diameter of outer wall 13 in a cross-sectional plane perpendicular to longitudinal axis 19 is greater than the outer diameter of plug part 23b in FIG. 5b.

Likewise, this socket having wrench width dimension S2 may also be used to screw in the pressure sensor in FIG. 5a, in which case the same wrench width adapter is used. The pressure sensor in FIG. 5a could also be directly screwed in using a socket having wrench width dimension S1, since this socket in FIG. 5a can be pushed over plug part 23a. However, this socket, which corresponds to wrench width dimension S1, could not be pushed over plug part 23b of pressure sensor in FIG. 5b. Only with the aid of wrench width adapter 1 is it now advantageously possible to screw the pressure sensors, shown in FIG. 5a and FIG. 5b, into the associated threaded openings, using the same tool.

What is claimed is:

1. A wrench width adapter for a screw-in component, which is screwable into a threaded opening, comprising:
    a base body having a continuous inner recess, extending along a longitudinal axis, for receiving the screw-in component, wherein an inner wall of the base body that delimits the inner recess, in a cross-sectional plane perpendicular to the longitudinal axis, having, at least in part, a shape of a regular polygon corresponding to a first wrench width dimension, and an outer wall of the base body having, at least in part, a shape of a regular polygon corresponding to a second wrench width dimension that is greater than the first wrench width dimension,
    wherein the base body includes at least one projection,
    wherein the base body a ring-shaped base plate that is perpendicular to the longitudinal axis and configured in one piece with the wall, and that protrudes into the inner recess at a bottom side of the base body to form the at least one projection, and laterally protrudes from the wall at a lower edge of the base body to form a flange,
    wherein the at least one projection includes a stop surface situated obliquely or perpendicularly with respect to the longitudinal axis.

2. The wrench width adapter of claim 1, wherein the at least one projection protruding into the inner recess forms a stop surface for the component.

3. The wrench width adapter of claim 1, wherein at least one fastening arrangement to fasten the base body to the component is provided on the base body.

4. The wrench width adapter of claim 3, wherein the at least one fastening arrangement in a direction of the longitudinal axis includes a tab that protrudes from the base body in a direction of the inner recess on the side of the base body facing away from the at least one projection.

5. The wrench width adapter of claim 3, wherein the at least one fastening arrangement includes a detent, a securing lug, or a secured wall section.

6. The wrench width adapter of claim 1, wherein the base body includes a circumferential wall that extends in the longitudinal axis, the inner side of which forms the inner wall and the outer side of which forms the outer wall, and/or the base body includes a ring-shaped base plate that is perpendicular to the longitudinal axis, and that protrudes into the inner recess, so as to form the at least one projection.

7. The wrench width adapter of claim 1, wherein the base body includes plastic or metal.

8. A combination of a wrench width adapter and a component, comprising:
    a wrench width adapter device including a base body having a continuous inner recess, extending along a longitudinal axis, for receiving the screw-in component, wherein an inner wall of the base body that delimits the inner recess, in a cross-sectional plane perpendicular to the longitudinal axis, having, at least in part, a shape of a regular polygon corresponding to a first wrench width dimension, and an outer wall of the base body having, at least in part, a shape of a regular polygon corresponding to a second wrench width dimension that is greater than the first wrench width dimension;
    a screw-in component that is screwable into a threaded opening, and includes a threaded connector and a component base body that adjoins in the longitudinal axis and an outer circumference of which in a cross-sectional plane perpendicular to the longitudinal axis has, at least in part, a shape of a regular polygon corresponding to the first wrench width dimension, and the screw-in component is inserted into the receptacle so that the threaded connector protrudes outwardly from the base body of the wrench width adapter device in a direction of the longitudinal axis,
    wherein the at least one projection protruding into the inner recess forms a stop surface for the component,
    wherein at least one fastening arrangement to fasten the base body to the component is provided on the base body,
    wherein the base body includes a circumferential wall that extends in the longitudinal axis, the inner side of which forms the inner wall and the outer side of which forms the outer wall, and the base body includes a ring-shaped base plate that is perpendicular to the longitudinal axis, and that protrudes into the inner recess, so as to form the at least one projection, and
    wherein the threaded connector is provided with the ring-shaped base plate on a side of the base body such that the threaded connector protrudes outwardly from the base body of the wrench width adapter device.

9. The combination of claim 8, wherein the component that is screwable into a threaded opening is a sensor.

10. The combination of claim 8, wherein the component that is screwable into a threaded opening is a pressure sensor.

11. The wrench width adapter of claim 1, wherein the base body includes a circumferential wall that extends in the longitudinal axis, the inner side of which forms the inner wall and the outer side of which forms the outer wall.

* * * * *